United States Patent [19]

Brodbeck

[11] Patent Number: 4,663,989

[45] Date of Patent: May 12, 1987

[54] AUXILIARY PLANET-WHEEL GEAR FOR A MOTOR VEHICLE

[75] Inventor: Werner Brodbeck, Stuttgart, Fed. Rep. of Germany

[73] Assignee: Daimler-Benz Aktiengesellschaft, Fed. Rep. of Germany

[21] Appl. No.: 663,541

[22] Filed: Oct. 22, 1984

[30] Foreign Application Priority Data

Oct. 22, 1983 [DE] Fed. Rep. of Germany ....... 3338417

[51] Int. Cl.[4] ......................... F16H 3/44; F16H 57/04

[52] U.S. Cl. ..................................... 74/781 R; 74/467

[58] Field of Search ..................... 74/781 R, 805, 467, 74/750 R, 752 B, 782, 784; 184/6.12, 11.1, 11.4

[56] References Cited

U.S. PATENT DOCUMENTS

| | | | |
|---|---|---|---|
| 2,722,303 | 11/1955 | Utz | 74/781 R |
| 2,795,155 | 6/1957 | Bade | 74/805 |
| 2,943,517 | 7/1960 | Markley | 184/11.1 |
| 2,984,126 | 5/1961 | Feaster | 74/781 R |
| 3,038,354 | 6/1962 | Bernard | 74/781 R |
| 3,469,473 | 9/1969 | Forster | 74/781 R |
| 4,271,928 | 6/1981 | Northern | 184/6.12 X |
| 4,378,711 | 4/1983 | Daniel | 74/467 |
| 4,489,626 | 12/1984 | Lemon | 74/781 R |

FOREIGN PATENT DOCUMENTS

| | | | |
|---|---|---|---|
| 974896 | 9/1975 | Canada | 184/6.12 |
| 1238346 | 4/1967 | Fed. Rep. of Germany . | |
| 2801812 | 7/1979 | Fed. Rep. of Germany . | |
| 3103397 | 8/1982 | Fed. Rep. of Germany . | |
| 1340593 | 12/1973 | United Kingdom . | |
| 0696214 | 11/1979 | U.S.S.R. | 74/781 R |

*Primary Examiner*—Leslie A. Braun
*Assistant Examiner*—David Novais
*Attorney, Agent, or Firm*—Barnes & Thornburg

[57] ABSTRACT

In an auxiliary planet-wheel gear for a motor vehicle, a drive drum fixed in terms of rotation relative to an outer central wheel, a shift sleeve connecting an inner central wheel to a brake located outside the drive drum, and an intermediate drive shaft fixed in terms of rotation relative to a planet carrier are arranged concentrically relative to one another. With reference to the main gear axis, the radially outer drive drum and the shift sleeve are each supported by a roller bearing relative to the centrally arranged intermediate drive shaft. The roller bearing of the shift sleeve is arranged offset axially in the direction of the brake in relation to the central wheels. Finally, the planet carrier is connected to an annular bearing extension for supporting the roller bearing of the drive drum. To obtain a construction which is short in the direction of the main gear axis, the drive drum has only a single roller bearing. This roller bearing, together with the associated bearing extension, is likewise arranged offset axially in the direction of the brake, in relation to the central wheels. Such an auxiliary gear is particularly suitable for driving secondary units of an internal-combustion engine.

13 Claims, 1 Drawing Figure

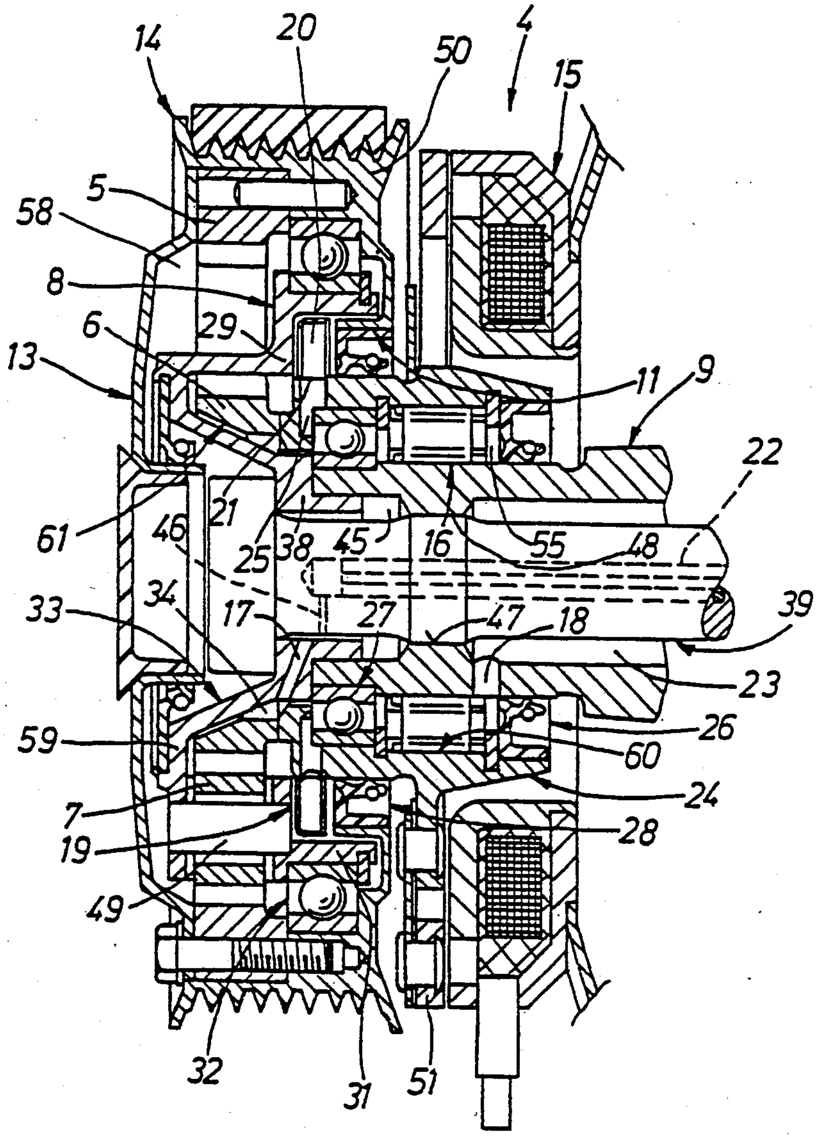
14
20
50
4
15
5
58
8
29
6
13
11
9
22
61
21
46
25
38
45
16
55
48
33
34
17
27
47
18
39
23
59
26
60
24
7
28
19
49
32
31
51

AUXILIARY PLANET-WHEEL GEAR FOR A MOTOR VEHICLE

BACKGROUND AND SUMMARY OF THE INVENTION

The invention relates to an auxiliary planet-wheel gear for motor vehicles of the type in which a drive drum fixed in terms of rotation relative to an outer central wheel, a shift sleeve connecting an inner central wheel to a brake located outside the drive drum, and an intermediate drive shaft fixed in terms of rotation relative to a planet carrier are arranged concentrically relative to one another.

In a known auxiliary gear of this type (German Published Unexamined Patent Application (DOS) No. 2,801,812), the drive drum is supported at its end facing the brake relative to the shift sleeve by means of a roller bearing and, at its other end, relative to the intermediate drive shaft, by means of a roller bearing, so that the two central wheels and the planet carrier are arranged in the interior enclosed by the two roller bearings. This known auxiliary gear has a construction which is long in the direction of the main gear axis, because the roller bearings used for support relative to the intermediate drive shaft, the set of planet wheels, the roller bearings used for support relative to the shift sleeve, and an annular seal arrangement inserted between the drive drum and shift sleeve are arranged axially behind one another.

A further known auxiliary planet-wheel gear of a similar type described in U.S. Pat. No. 3,469,473 has an even longer construction, because, in this arrangement, on the one hand the brake connected to the shift sleeve is located in the drive drum, and on the other hand the drive drum roller bearing used for support relative to the intermediate drive shaft is located on the side of the central wheels which is opposite the brake.

Finally, the disadvantage of a long construction is also inherent in known auxiliary planet-wheel gears of a different generic type (see German Published Unexamined Patent Application -DOS- No. 3,103,397 and above-noted U.S. Pat. No. 2,943,517), because in these arrangements the drive drum or a gear member used in an appropriate way as a gear output member each require, likewise, two roller bearings located on both sides of the central wheels.

An object on which the invention is based is primarily to achieve a short overall length in an auxiliary planet-wheel gear of the generic type. This object is achieved according to preferred embodiments of the invention by providing that the drive drum has only a single roller bearing which, together with an associated bearing extension of the planet carrier, is offset in the direction of the brake in relation to the central wheels.

In especially preferred embodiments of the invention, with reference to the main gear axis, the radially outer drive drum and the shift sleeve are each supported relative to the centrally arranged intermediate drive shaft by roller bearings with the roller bearing of the shift sleeve being arranged offset in the direction of the brake in relation to the central wheels. Further, the planet carrier is converted to an annular bearing extension supporting the roller bearing of the drive drum.

According to another aspect of preferred embodiments of the invention, the single roller bearing of the drive drum is arranged concentrically on the outside relative to the roller bearing of the shift sleeve.

According to another aspect of preferred embodiments of the invention, the bearing extension projects beyond a seal arrangement inserted between the drive drum and shift sleeve.

According to another aspect of preferred embodiments of the invention, the planet carrier has a hub for connecting it fixedly in terms of rotation to the intermediate drive shaft, and two radial annular webs for retaining planet bolts, one annular web of which is provided with the bearing extension, characterized in that the bearing extension is connected to the annular web facing the brake and the other annular web is connected by means of a conical hub part to the hub arranged axially offset in the direction of the brake in relation to the central wheels.

According to another aspect of preferred embodiments of the invention, the roller bearing of the shift sleeve is a ball bearing.

According to another aspect of preferred embodiments of the invention there is provided a flow guide device which projects into an annular space between the annular web facing the brake and the gasket arrangement inserted between the drive drum and shift sleeve, which flow guide device is arranged fixedly in terms of movement relative to the shift sleeve and scoops lubricant from the annular space and conveys it through a free-wheel coupling into a shaft channel of the intermediate drive shaft, and wherein the free-wheel coupling is located next to the roller bearing of the shift sleeve, characterized in that the roller bearing of the shift sleeve is located in the flow path between the flow guide device and the free-wheel coupling.

Further objects, features, and advantages of the present invention will become more apparent from the following description when taken with the accompanying drawing which shows, for purposes of illustration only, an embodiment constructed in accordance with the present invention.

BRIEF DESCRIPTION OF THE DRAWINGS

The single drawing FIGURE is a sectional schematic view of an auxiliary planet-wheel gear arrangement constructed in accordance with a preferred embodiment of the present invention.

DETAILED DESCRIPTION OF THE DRAWINGS

An intermediate drive shaft 9 designed in the form of a hollow shaft is clamped fixedly in terms of movement by means of an inner central screw bolt 39 between a hub 38 of a planet carrier 8 and a shaft end of a crankshaft of an internal-combustion engine (not shown in any more detail).

A lubricant channel of the crankshaft is connected to the pressure-feed lubricating system of the internal-combustion engine and is linked to a lubricant channel 22 in the screw bolt 39. The other end of channel 22 is connected by means of a radial channel 46 in the screw bolt 39 to an annular channel 45 which is provided between the screw bolt 39 and the intermediate drive shaft 9 or the hub 38 and from which extend lubricant channels 17 used as a lubricant inlet of a rotating gearbox 13, in which the planet carrier 8 is located.

Bearing bolts 49 are arranged fixedly in terms of movement on the planet carrier 8 by means of a radial annular web 29. Planet wheels 7 are mounted rotatably on bolts 49 and are disposed to mesh with an outer central wheel 5 and an inner central wheel 6. The outer central wheel 5 is mounted fixedly in terms of rotation on a drive drum 50 of the gearbox 13, the outer periphery of this drive drum being designed as a V-belt pulley 14.

The inner central wheel 6 is mounted on the intermediate drive shaft 9 via a roller bearing 27 and at the same time is made in one piece with a shift sleeve 24 which, together with the intermediate drive shaft 9, passes through a housing orifice 11 in the gearbox 13 and which is connected at its outer end to a brake disc 51 of an electromagnetic brake 15. The shift sleeve 24 is sealed off from the intermediate drive shaft 9 by an inner annular seal arrangement 26 and from the drive drum 50 by an outer annular seal arrangement 28. Located between the inner seal arrangement 26 and the radially inner roller bearing 27 is a free-wheel coupling 16 which couples the inner central wheel 6 to the planet carrier 8 when the central wheel is to override the planet carrier in the direction of drive rotation. Between the outer seal arrangement 28 and the web ring 29, a flow guide device 19 engages into an annular space and is retained fixedly on the outer periphery of the shift sleeve 24. When the inner central wheel 6 is locked, the flow guide device 19 works virtually as a stationary scoop wheel with two spiral flow channels which succeed one another in the peripheral direction and which start from an orifice 20, located on the outer periphery and acting as a lubricant inlet, and each end at a channel-wall part set obliquely inwards on the inner periphery or on the outer shell of the shift sleeve 24. The shift sleeve 24 is provided with radial lubricant channels 25 which are connected radially on the outside to the particular channel end to be considered as a lubricant outlet 21 and belonging to the respective flow channel.

Between the free-wheel 16 and the adjacent inner annular seal arrangement 26 is an annular space 55 which is likewise limited radially by the intermediate drive shaft 9 and shift sleeve 24. Radial lubricant channels 18 forming the outlet of the gearbox 13 for the lubricant start from the annular space 55 and end in an inner annular shaft channel 23 which is provided between the screw bolt 39 and intermediate drive shaft 9. The outer shaft end has on its periphery axial shaft channels connecting the shaft channel 23 to radial lubricant channels of the intermediate drive shaft 9 which open into the interior of the crankcase above the oil pan. At its opposite end the annular shaft channel 23 is closed by matching sealing surfaces 47 and 48 of the intermediate drive shaft 9 and screw bolt 39.

The channels 17, used as an inlet of the gearbox 13 for the lubricant, open radially on the outside into an annular space 34 which is arranged axially between the sun wheel 6 and planet carrier 8 and which communicates with the radially outer annular space 58 located at the height of the planets 7.

The auxiliary planet-wheel gear 4 constructed in this way is supplied with lubricant as follows:

The lubricating oil flowing out of the channel of the crankshaft under pressure first passes via the inner shaft channels and 22 and 46 of the screw bolt 39 into the inner annular space 45 of the hub 38, from which it flows over into the inner annular space 34 of the gearbox 13 through the inlet channels 17. The lubricating oil flowing in under pressure passes into the outer annular space 58 under the effect of centrifugal force. It flows axially from this annular space 58 through the teeth and mountings of the planets 7 in the direction of the annular space receiving the flow guide device 19. Especially when the shift sleeve 24 is locked, lubricating oil from the lubricating oil circulating under high kinetic energy in the annular space between the web ring 29 and outer annular seal arrangement 28 is forced through the free-wheel by the flow guide device 19 then acting as a scoop wheel; and under these conditions this is particularly advantageous because, at the same time, the two thrust rings of the free-wheel rotate relative to one another. The lubricating oil flowing out of the free-wheel 16 still under the effect of the flow guide device 19 passes, via the outlet channels 18 in the intermediate drive shaft 9 and the annular inner shaft channel 23, to the outlet channels of the intermediate drive shaft 9 and thus back to the oil sump of the oil pan, from which the lubricant pump sucks it up.

As a result of this arrangement of the flow guide device 19 in the gearbox 13, two important advantages in particular are achieved. On the one hand, the lubricating oil trapped in the encircling gearbox 13 as a result of the effect of centrifugal force is effectively discharged into the shaft channel 23 used for the return flow. On the other hand, lubricating oil flows through the free-wheel 16 under the pump-like pressure effect of the flow guide device 19 located immediately upstream, precisely when lubrication is especially necessary as a result of the relative rotation which occurs. Finally, as regards this lubrication of the auxiliary gear, it is particularly advantageous that the total quantity of lubricating oil supplied under pressure via the shaft channel 23 should flow through the free-wheel 16.

The auxiliary planet-wheel gear 4 has three further important advantages:

a. the gearbox 13 is supported relative to the intermediate drive shaft 9 not directly, but indirectly via the planet carrier 8 by means of a roller bearing 32 arranged concentrically on the outside relative to the roller bearing 27,
b. the roller bearing 27 adjacent to the free-wheel 16 is located in the flow path of the lubricating oil between the flow guide device 19 and the free-wheel 16, and
c. the gearbox 13 has no second roller-bearing point so that the gasket arrangement 28 inserted into the housing orifice 11 for sealing the shift sleeve 24 is located immediately next to flow guide device 19.

As is evident from the drawing, the following described design has been adopted to achieve these above-noted advantages a to c.

The hub 38 of the planet carrier 8 is located on the end face of the planet 7 which faces the free-wheel 16, and it is connected to the annular web 59 located on the other end face by means of a conical hub part 33. The other web ring 29 of the planet carrier 8 is provided with an end-face annular bearing extension 31 projecting beyond the guide device 19 and the outer annular seal arrangement 28 for supporting the gearbox 13 by means of the roller bearing 32.

The lubricant channels 25 of the shift sleeve 24 which are connected to the lubricant outlet 21 of the flow guide device 19 open into the central passage 60 of the shift sleeve 24 on the end face of the roller bearing 27 facing away from the free-wheel 16.

The conical hub part 33 and the portion of the shift sleeve 24 having the central wheel 6 enclose the radially inner annular space 34 and a conical annular gap 61 connected to it. While the lubricant inlet 17 of the gearbox 13 opens into the annular space 34, the annular gap 61 is open both to the annular space 34 and to the annular space 58 of the gearbox 13 through which pass the teeth and mountings of the planets 7.

The belt pulley 14 is designed to receive only one V-belt which drives the auxiliary units jointly.

Especially when the shift sleeve 24 is at a standstill, the guide device 19 scoops lubricating oil from the annular space arranged axially between the web ring 29 and outer annular seal arrangement 28 and forces it in succession through the roller bearing 27 and free-wheel 16.

Thus, the total quantity of lubricating oil flowing in under pressure is also conveyed through the roller bearing 27 which alone is used to support the shift sleeve 24 and gearbox 13. A particular advantage of this auxiliary planet-wheel gear 4 is the axially short construction.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. An auxiliary planet-wheel gear arrangement for a motor vehicle or the like, comprising:
- intermediate drive shaft means,
- planet carrier means rotatably fixed to the intermediate drive shaft means,
- inner and outer central wheel means operatively connected with the planet carrier means,
- drive drum means rotatably fixed to the outer central wheel means,
- selectively actuable brake means,
- shift sleeve means connecting the inner central wheel means to the brake means,
- first bearing means rotatably supporting the drive drum means relative to the intermediate drive shaft means,
- and second bearing means rotatably supporting the shift sleeve relative to the intermediate drive shaft means,
- wherein said planet carrier means includes annular bearing extension means for supporting the first bearing means,
- and, wherein said first bearing means is a roller bearing which, together with the associated bearing extension means, is arranged between the central wheel means and the brake means in axial direction of the intermediate drive shaft means,
- wherein the intermediate drive shaft means, the planet carrier means, the inner and outer central wheel means, the drive drum means, the brake means, and the shift sleeve means are all arranged concentrically with respect to one another, and
- wherein the drive drum means is disposed radially outwardly of the shift sleeve means, and wherein the second bearing means is arranged between the central wheel means and the brake means in axial direction of the intermediate drive shaft means.

2. An arrangement according to claim 1, in which the planet carrier means has a hub for connecting it fixedly in terms of rotation to the intermediate drive shaft means, and two radial annular webs for retaining planet bolts, one annular web of which is provided with the bearing extension means, wherein the bearing extension means is connected to the annular web facing the brake means, and the other annular web is connected by means of a conical hub part to the hub arranged between the central wheel means and the brake means in axial direction of the intermediate drive shaft means.

3. An arrangement according to claim 1, wherein the roller bearing of the shift sleeve is a ball bearing.

4. An arrangement according to claim 1, in which a flow guide device is provided for guiding lubricant flow projecting into an annular space between an annular web facing the brake means and a gasket arrangement inserted between the drive drum means and the shift sleeve means, said flow guide device being arranged fixedly in terms of movement relative to the shift sleeve means and serving to scoop lubricant from the annular space and conveying it through a free-wheel coupling into a shaft channel of the intermediate drive shaft means, and in which the free-wheel coupling is located next to the roller bearing of the shift sleeve serving as the second roller bearing means, wherein the roller bearing of the shift sleeve is located in the flow path between the flow guide device and the free-wheel coupling.

5. An arrangement according to claim 1, wherein the bearing extension means surrounds concentrically seal arrangement inserted between the drive drum means and shift sleeve means.

6. An arrangement according to claim 5, wherein the roller bearing for the drive drum is arranged concentrically on the outside relative to a roller bearing of the shift sleeve forming said second bearing means.

7. An arrangement according to claim 1, wherein the roller bearing for the drive drum is arranged concentrically on the outside relative to a roller bearing of the shift sleeve forming said second bearing means.

8. An arrangement according to claim 7, wherein the bearing extension means surrounds concentrically a seal arrangement inserted between the drive drum means and shift sleeve means.

9. An arrangement according to claim 8, in which the planet carrier means has a hub for connecting it fixedly in terms of rotation to the intermediate drive shaft means, and two radial annular webs for retaining planet bolts, one annular web of which is provided with the bearing extension means, wherein the bearing extension means is connected to the annular web facing the brake means, and the other annular web is connected by means of a conical hub part to the hub arranged between the central wheel means and the brake means in axial direction of the intermediate drive shaft means.

10. An arrangement according to claim 9, in which a flow guide device is provided for guiding lubricant flow projecting into an annular space between an annular web facing the brake means and a gasket arrangement inserted between the drive drum means and the shift sleeve means, said flow guide device being arranged fixedly in terms of movement relative to the shift sleeve means and serving to scoop lubricant from the annular space and conveying it through a free-wheel coupling into a shaft channel of the intermediate drive shaft means, and in which the free-wheel coupling is located next to the roller bearing of the shift sleeve serving as the second roller bearing means, wherein the roller bearing of the shift sleeve is located in the flow path between the flow guide device and the free-wheel coupling.

11. An arrangement according to claim 7, in which a flow guide device is provided for guiding lubricant flow projecting into an annular space between an annular web facing the brake means and a gasket arrangement inserted between the drive drum means and the shift sleeve means, said flow guide device being arranged fixedly in terms of movement relative to the shift sleeve means and serving to scoop lubricant from the annular space and conveys it through a free-wheel coupling into a shaft channel of tne intermediate drive shaft means, and in which the free-wheel coupling is located next to the roller bearing of the shift sleeve serving as the second roller bearing means, wherein the roller bearing of the shift sleeve is located in the flow path between the flow guide device and the free-wheel coupling.

12. An arrangement according to claim 1, wherein the planet carrier means has a hub for connecting it fixedly in terms of rotation to the intermediate drive shaft means, said planet carrier means surrounding concentrically the central wheel means and a seal arrangement inserted between the drive drum means and shift sleeve means.

13. An arrangement according to claim 12, wherein said bearing extension means is arranged concentrically on the outside relative to said roller bearing of the shift sleeve forming said second bearing means.

* * * * *